United States Patent [19]
Black et al.

[11] 3,942,511
[45] Mar. 9, 1976

[54] SANDWICHED STRUCTURE FOR PRODUCTION OF HEAT AND HYDROGEN GAS

[75] Inventors: Stanley A. Black, Port Hueneme; James F. Jenkins, Camarillo, both of Calif.

[73] Assignee: The United States of America as represented by the Secretary of the Navy, Washington, D.C.

[22] Filed: Sept. 19, 1974

[21] Appl. No.: 507,652

[52] U.S. Cl. ............... 126/248; 204/129; 204/248; 204/249; 252/188; 423/657; 423/658
[51] Int. Cl.² .................... F24J 1/00; C01B 1/07
[58] Field of Search.................. 204/248, 249, 129; 423/658, 657; 252/188; 126/263

[56] References Cited
UNITED STATES PATENTS
2,623,812   12/1952   Eborall et al. ............... 423/657 X

*Primary Examiner*—G. L. Kaplan
*Attorney, Agent, or Firm*—Richard S. Sciascia; Joseph M. St.Amand

[57] ABSTRACT

Micro electrochemical cells which utilize an intimate mixture of active and passive metals are reacted with seawater for producing heat and hydrogen gas for use as a heat source, energy source, or buoyancy generator for use in remote areas.

12 Claims, 5 Drawing Figures

- IRON PARTICLE
- MAGNESIUM PARTICLE
- IRON PARTICLE
- IRON PARTICLE

Legend:
- □----□ TURNINGS
- ○——○ COARSE POWDER
- ▲—·—▲ VERY FINE POWDER
- A = IRONIZED PRODUCTS
- B = SIMPLE MIXTURE OF IRON AND MAGNESIUM
- C = MAGNESIUM ONLY (NO IRON)

Y-axis: VOLUME OF HYDROGEN EVOLVED, CUMULATIVE (ml)
X-axis: TIME (HOURS)

SANDWICHED STRUCTURE FOR PRODUCTION OF HEAT AND HYDROGEN GAS

This invention is related to U.S. patent applications Ser. No. 507,918 for A HEAT SOURCE FOR CURING UNDERWATER ADHESIVES, now U.S. Pat. No. 3,906,926, and Ser. No. 507,645 for ELECTROCHEMICAL ENERGY SOURCE FOR DIVER SUIT HEATING, now U.S. Pat. No. 3,884,216, both filed together herewith on Sept. 19, 1974.

BACKGROUND OF THE INVENTION

The present invention relates to electrochemical means for producing heat and/or hydrogen gas, and more particularly to a simple, reliable, efficient and compact means for producing heat and/or hydrogen gas for use in remote areas. For example: the present invention may be used for replacing lost body heat for undersea divers or combat troops; it can be used for heating machinery or instruments in remote or cold areas; it may also be used for production of electrical or mechanical energy through use of a heat or expansion engine in remote locations; and, hydrogen produced thereby can be used for buoyancy in deep sea recovery operations or for production of energy by use of fuel cell type systems.

The electrochemical reaction between active metals such as magnesium and passive metals such as iron when immersed in electrolyte has been proposed for use as a heat source. Other systems advocate the use of massive plates of magnesium and iron (two-plate system) separated by an electrode gap, electrically shorted together and immersed in seawater. Such arrangement results in complex control problems and requires the use of large plate surface areas which result in bulky cumbersome apparatus. The arrangement is not adaptable to direct production of localized heat, thus the diver must carry a single bulky reaction chamber which can greatly restrict his maneuverability and reduce his effectiveness. In the two-plate system, heat production effectiveness is reduced because of operational problems associated with disposal of reaction products, magnesium hydroxide and hydrogen gas. Volumes of hydrogen produced requires a large gas collection area to prevent dewatering of heat producing plates. Removal of hydrogen from the reaction chamber of a diver heater is complicated because of changing orientation of the diver. Production of magnesium hydroxide tends to clog the reaction area between plates, thus reducing power output. Reaction control is difficult and complicated because of continual depletion of active metal and the subsequent increasing electrode gap.

Previous methods used to produce hydrogen gas for deep sea buoyancy operations use exotic, expensive and hazardous chemicals which are recently becoming unavailable. For example, the use of hydrazine is presently being developed. Hydrazine requires complex control systems for ocean operations. Hydrazine is toxic, a moderate fire hazard and potentially explosive.

Past proposals for the use of metallic elements for generation of hydrogen for buoyancy have been neglected because of the relatively slow reaction rate of metals with seawater. Coupling active metals with a passive metal increases this rate over 100 fold. By the use of the micro electrochemical cells described herein, another order of magnitude increase in reaction rate can be achieved for use in generating hydrogen.

SUMMARY

It is not necessary to construct a battery of parallel plates to react magnesium with seawater. When magnesium and iron are fastened together in intimate contact and immersed in seawater, a galvanic couple is formed. Under such conditions, the magnesium corrodes at a greatly accelerated rate. The reaction is exothermic. It is shown by the present invention that a mixture of finely divided iron and magnesium powders which have been ground into a composite material in a ball mill, or the like, can be reacted rapidly with seawater to serve as a heat source for divers, etc.

OBJECTS OF THE INVENTION

It is an object of the invention, therefore, to provide a heat source comprising micro electrochemical cells.

Another object is to provide micro electrochemical cells utilizing an intimate mixture of active and passive metals for producing heat and hydrogen.

Still another object is to provide an intimate mixture of active and passive powdered metals for the rapid production of heat and hydrogen in electrolyte.

A further object is to provide a heat source using micro electrochemical cells for warming various parts of the human body.

Other objects, advantages and novel features of the invention will become apparent from the following detailed description of the invention when considered in conjunction with the accompanying drawings.

DETAILED DESCRIPTION OF THE PREFERRED EMBODIMENT

Figure 1:
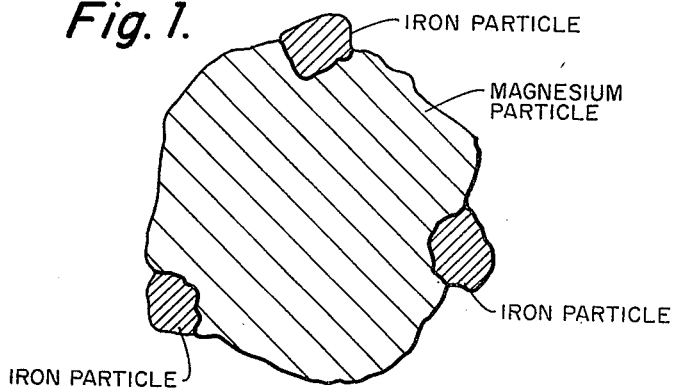
FIG. 1 is an idealized illustration of a micro electrochemical cell formed from ironized magnesium.

The system for producing heat and hydrogen as described herein utilizes an intimate mixture of active and passive metals (e.g. magnesium and iron) to form micro electrochemical cells. It is of primary importance that the active and passive metals be mixed so that the electrical contact resistance between them is very low. This degree of mixing is achieved by the use of a ball mill apparatus. Iron and magnesium particles placed in a ball mill with an inert solvent and ground together causes iron particles to become embedded on the magnesium particles. The combination of iron particles embedded on a magnesium particle forms a miniature electrochemical cell, such as shown in FIG. 1, which when placed in an electrolyte produces heat and hydrogen gas. In the case of a diver heater, the electrolyte selected is seawater because of safety, reliability and abundant supply. With the seawater electrolyte, heat is produced from the exothermic formation of Mg(OH)$_2$. Theoretically, 3.47 calories and 1 ml of hydrogen are produced for every mg of magnesium reacted at 23.7°C.

The reaction which occurs in the micro cells is essentially the same nature as that of a massive two-plate cell. However, with the micro cell arrangement larger exposed surface areas of active metal are available which allow the reaction to proceed at much high rates. Variations of powder size and the ratio of active to passive metal surface area can be used to produce an infinite variety of heat sources capable of providing energy for seconds, hours, days, weeks, or years of operational life. Pressing the mixture together can provide a single plate heat or hydrogen producing cell, and sintering the mixtures can extend the duration of a particular mixture. The final form of the micro cell power source will be dependent on the application. For example, the powdered form of the micro cells allows the heat or hydrogen source to be flexible and conform to contours such as diver's hand or the foot of a hiker or combatant soldier. In powdered form, a slurry of active and passive metals can be metered into a reactive chamber to produce a variable controlled reaction rate. In pressed and/or sintered form, the single plate cell may be formed into a rigid shape with a predetermined reaction rate. Sodium chloride particles may be interdispersed in the cell matricies so that the simple addition of water will activate the reaction. Numerous material combinations are available utilizing other active and passive metals together with binders, additions of trace elements such as mercury, etc., and a variety of electrolytes depending on the particular application.

The present system of utilizing electrochemical reactions to produce heat and hydrogen has many advantages, such as:

a. Simplicity of design. The use of micro cells lends itself to simplified reaction control over previous methods by selection of material size, binders, trace additives, extent of intimate contact, sintering or pressing. Metering of electrolyte or metal slurry into a reactor chamber can be used for reaction control.

b. Larger available surface area in comparison to any previous method affords compact lighter weight design.

c. Ease of manufacture. Simply grinding the powdered metals in a ball mill produces a heat or hydrogen generating cell. End products are simply measured into a single reaction chamber e.g. (canister) to provide a desired output.

d. Formability. This mew method lends itself to a variety of different sizes and shapes. For example, the powdered micro cells can be packed around any object to be heated, thus conforming to the shape of the object. Simply adding salt water activates the process.

e. Long shelf life and ease of storage. The premixed micro cells may be stored indefinitely in evacuated plastic bags or jars or in an inert atmosphere. Simply opening the container and adding salt water will activate the reaction.

f. Extended duration applications. In cases where long operational periods are required, the material can be premixed to provide the desired results.

g. Single cell construction. The previous methods require the use of two preassembled plates which require an electrode gap. This new method provides the electrochemical cell in a single plate or powdered form which is especially adaptable to use in remote areas where space and ease of transportation and portability is essential.

The present invention is intended to cover all combinations of active and passive materials intimately mixed together to form micro electrochemical cells. All powder particles sizes, mixing methods, additives and aggregations of mixed particles into larger groups are considered as extensions of this basic concept described herein.

Experimental investigation into the use of a powdered metal source for the production of heat and hydrogen gas is discussed below.

Measurements of the cumulative volumes of hydrogen evolved by the reaction of magnesium with seawater were made periodically by collecting the hydrogen over water in inverted graduated cylinders.

Simultaneous measurements of the heat liberated and hydrogen evolved were also made.

Finely divided magnesium of different particle sizes was employed: magnesium turnings, a coarse magnesium powder, and a very fine magnesium powder. The coarse powder passed a U.S. Standard Sieve (ASTM Specification) No. 30 (openings of 590 microns) but was stopped by a Sieve No. 50 (openings of 297 microns). The fine powder consisted of a mixture, all of which passed U.S. Standard Sieve No. 100 (openings of 149 microns) but only approximately half of which passed Sieve No. 200 (openings of 74 microns). An analytical-grade iron powder which passed the U.S. Standard Sieve No. 200 was also used for some of the experiments.

Measurements were made of the maximum volumes of hydrogen liberated from magnesium of the three particle sizes by reaction with an excess of dilute hydrochloric acid. Results for half-gram samples at 24°C were as follows:

| | |
|---|---|
| Calculated | 501 ml |
| Turnings | 480 ml |
| Coarse Powder | 490 ml |
| Fine Powder | 330 ml |

The fine powder was not pure and apparently contained only about 66% of free magnesium.

Reaction of finely divided magnesium with seawater:

A one-half gram sample and a one-gram sample of coarse magnesium powder were each reacted with 25-ml portions of seawater at 68°C. Although both samples reacted slowly, the evolution of hydrogen was measurable. It was twice as rapid from the one-gram sample as from the ½ gram sample.

One-half gram samples of finely divided magnesium of the three previously described particle sizes were reacted with 25-ml portions of seawater at 68°C. The magnesium turnings liberated hydrogen at the slowest rate; the coarse powder, at an intermediate rate; and the fine powder at the fastest rate during the first part of the experiment. However, the rate of evolution of hydrogen from the fine powder slowed down abruptly and all but ceased when only about one-half of the magnesium had reacted.

One-half gram samples of magnesium of each of the three particle sizes were then mixed with equal weights of fine iron powder. The mixtures were covered with seawater and permitted to react. The reaction flasks were again immersed in a water bath maintained at 68°C. The rates of evolution of hydrogen from all three mixtures were approximately double the rates in the previous tests in which iron powder had not been added.

Twenty-five gram samples of magnesium of each of the three particle sizes were then "ironized." In this process, the magnesium samples were mixed with equal weights of iron powder, placed in ball mill jars, covered with an inert solvent (1, 1, 1-trichloroethane), and then ground together on the ball mill for 16 hours. The solvent was evaporated and, when dry, the magnesium turnings were separated from most of the iron powder by sifting. A little of the iron powder remained embedded in the magnesium turnings. Similarly, the coarse magnesium powder was separated from the fine iron powder by sifting. The fine magnesium powder and the fine iron powder were both approximately the same size and could not be conveniently separated by sifting so they were permitted to remain as a mixture.

One-half gram samples of the ironized magnesium turnings and ironized coarse magnesium powder and a one-gram sample of the mixed fine powder of iron and ironized magnesium were each covered with 25 ml of seawater and permitted to react. As before, the reaction mixtures were maintained at 68°C. In all three cases the rates of evolution of hydrogen were nearly 50 times greater than the rates had been from the simple mixtures of iron and magnesium.

Figure 2:
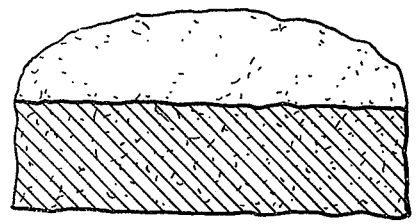
FIG. 2 illustrates a pellet prepared by compressing mixtures of powdered magnesium and iron or ironized magnesium.

The evolution of hydrogen from various magnesium samples was plotted (FIG. 2) against time on a simple linear scale. By inspection of the curves, it was possible to estimate the times required for 25% and 50% of the magnesium to be consumed. These values were based on the volumes of hydrogen evolved relative to the volumes evolved when similar samples of magnesium were treated with dilute hydrochloric acid. The values are useful for comparing the reactivities of the various samples of magnesium. They are given in Table 1 and are referred to as the quarter-lives and half-lives for the various materials.

Later, another batch of the ironized magnesium was prepared from the coarse magnesium powder and fine iron powder. The second batch turned out to be more reactive than the first and reacted with seawater nearly 20 times more rapidly than the first batch. The half-lives were approximately 4 and ¼ hour, respectively, for the first and second batches. The second batch, which was larger than the first, was employed in the ensuing experiments.

TABLE 1

Estimated quarter-lives (t¼) and half-lives (t½), in hours, for various magnesium samples in seawater at 68°C.

| | Magnesium Turnings | | Magnesium Powder, Coarse Grind | | Magnesium Powder, Fine Grind | |
|---|---|---|---|---|---|---|
| | t¼ (hr) | t½ (hr) | t¼ (hr) | t½ (hr) | t¼ (hr) | t½ (hr) |
| Magnesium only | 220* | >1000* | 39 | 114 | 18 | —** |
| Mixture of Iron and Magnesium | 132 | 500 | 18 | 52 | 5 | —** |
| Ironized Magnesium | 2½ | 10 | ½ | 4 | <<¼ | <¼ |

*Extrapolated from data at 120 hours and less.
**—Impossible to estimate.

Figure 3:
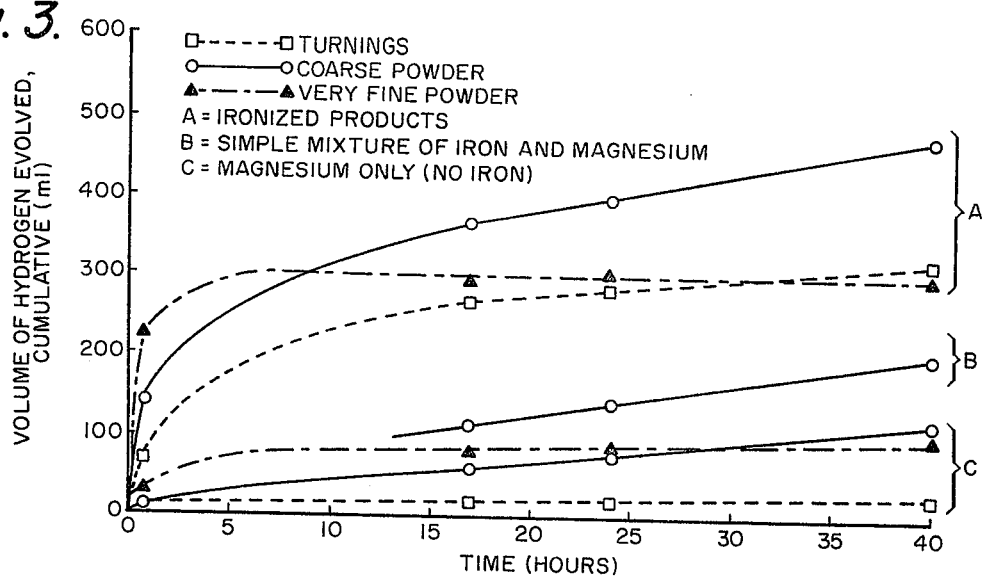
FIG. 3 is a curve showing the evolution of hydrogen by reaction of finely divided magnesium and magnesium/iron with seawater electrolyte.

Reaction of pelletized magnesium products with seawater:

Pellets approximately 1.25 inches in diameter and 0.25 inch thick, such as shown in cross-section in FIG. 3, were prepared by compressing the ironized magnesium under a pressure of 37,500 psi. A comparison was made of the reaction rates of the pelletized and unpelletized ironized magnesium powder. For the test, a pellet was sawed in two and each half was trimmed to a weight of one-half gram. The experiment was conducted in duplicate. Two ½-gram samples of the unpelletized powder and two ½-gram segments of the pellets were used. The pelletized samples reacted a little more slowly than the unpelletized powder, especially during the first half hour. They also reacted at a little more uniform rate than the unpelletized powder which reacted at a very rapid initial, but steadily declining rate.

Pellets were also made from simple mixtures of iron and magnesium. Each of the pellets contained 1 gram of the coarse magnesium powder. One of the pellets also contained 500 mg of fine iron powder; the second contained 50 mg of iron powder; and the third contained no iron powder. The pellets were reacted with 50 ml of seawater maintained at 68°C. The cumulative volumes of hydrogen evolved in the reactions were measured periodically. Hydrogen was produced most rapidly by the pellets containing the greatest amount of iron and the least rapidly by the pellets to which no iron had been added.

Effect of temperature on reaction rates:

The effect of temperature on reaction rates was investigated. The experiments were conducted in the same manner as the other experiments with the exceptions that an ice bath and a room temperature bath were employed in addition to a 68°C bath. In the first experiment on temperature effects, ironized powdered magnesium was employed. In the second experiment, tests were made with pelletized ironized magnesium. Duplicate determinations were made for each material for each of the temperatures: 0°C, 24°C, and 68°C.

In all tests the initial reaction rates were fastest at 68°C, slowest at 0°C, and intermediate at 24°C. However, the rates all declined steadily. the decline occurred most rapidly in those maintained at 68°C; next, for those maintained at 24°C; and slowest, for those maintained at 0°C. The decline at 24°C was only slightly greater than the decline at 0°C, but the decline at 68°C was considerably greater. In about 400 minutes when the experiment was terminated, the cumulative volume of hydrogen liberated from the reaction maintained at 0°C was the greatest, indicating that hydrogen was generated fastest at 0°C. The volume liberated by the reaction at 24°C was nearly as great; but the volume liberated by the reaction at 68°C was merely 60% of the volume at 0°C.

Measurements of the Production of Heat:

Simultaneous measurements of the liberation of heat and evolution of hydrogen were made. Seven ½-gram samples of unpelletized powdered ironized magnesium were reacted with seawater. The volumes of seawater employed in the measurements were 10, 25, 50, 100, and 200 ml. The test results up to the times that the temperatures attained maximum values are summarized in Table 2.

The "dry" heat cell:

An experiment was performed to see if the reaction could be controlled by the regulated addition of seawater to the dry ironized magnesium. One-half gram of ironized magnesium powder was placed in a dry test tube which was rested on the bottom of the dewar flask. Fifty ml of seawater was added to the flask. The water surrounded the bottom half of the test tube to serve as a heat sink but none was permitted to enter it. The test tube was so positioned in the dewar that the tip of the dropping burette was over the top of the test tube. Via the burette, 0.2 ml of seawater was added to the ironized magnesium powder initially and an additional 0.2 was added every 10 minutes until a total of 2 ml had been added. In 35 minutes the temperature rose from 25°C to 33°C and it was maintained at 33° – 35°C for the ensuing 2½ hours.

TABLE 2

Comparisons of hydrogen evolved and heats liberated by the reaction of ironized magnesium with various volumes of seawater.

| Volume of Seawater (ml) | Maximum Rise in Temp. (°C) | $\Delta H$ Calculated From Rise in Temp. (calories) | Volume of Hydrogen Evolved up to time Maximum Temp. Reached (ml) | $\Delta H^*$ Calculated from Volume of Hydrogen Evolved (calories) |
|---|---|---|---|---|
| 10 | 46 | 460 | 250 | 868 |
| 25 | 27 | 675 | 327 | 1,135 |
| 50 | 16 | 800 | 345 | 1,200 |
| 50 | 15½ | 775 | 360 | 1,250 |
| 100 | 9¼ | 925 | 350 | 1,215 |
| 200 | 5¾ | 1,150 | 385 | 1,336 |

*Calculations were based on the assumption that 3.47 calories of heat were liberated for each ml of hydrogen liberated.

In another run, the same amount of ironized magnesium powder was reacted with seawater in the same dewar flask. The flask contained the same amount of seawater and the same test tube, but the ironized magnesium powder was immediately mixed with the entire 52 ml of seawater. In this reaction the temperature rose to nearly 40°C in less than one hour but fell more rapidly than in the previous reaction in which the water addition was controlled.

Some crude measurements were made of the space occupied by the initial and final products when ironized magnesium powder is reacted with the minimum volume of seawater. A 25 ml volumetric flask was weighed and then filled with ironized magnesium powder. The weight of the powder was 24.7 gm. That is, the density of the loosely packed dry powder is approximately 1 gm per ml. A 2-ml microbeaker graduated in ½-ml increments was filled to the first ½-ml mark with dry ironized magnesium powder. The powder was slowly reacted with a very slight excess of seawater. During the reaction, the magnesium granules increased in size and changed color from silver to off-white. The volume occupied by the dried loosely packed magnesium hydroxide granules was 1½ ml, three times the original volume. Stoichiometry of reaction of magnesium and seawater:

The overall reaction of magnesium with seawater can be represented by the equation:

$$Mg + 2 H_2O \rightarrow Mg(OH)_2 + H_2 + \Delta h$$

where $\Delta h$ = heat of the reaction.

The theoretical amount of heat evolved in the same equation is 84.36 kilogram calories per gram molecular weight of magnesium at a constant temperature of 25°C ($-221.00 + 2 \times 68.32 = -84.36$). This value would ordinarily be corrected for the energy consumed in expanding the hydrogen. At atmospheric pressure, this correction would be approximately 0.6 kilogram calories per mole of magnesium. At ocean depths where the hydrostatic pressure is 10 atmospheres, the correction would be a mere 0.06 kilogram calories per mole. Disregarding these corrections, the calculated values for the heat liberated is 3,470 calories per gram or 1,830 watt hours per pound.

The theoretical volumes of hydrogen liberated in the reaction of magnesium with seawater is 1.007 ml per mg at 250°C (1.000 ml at 23.7°C). This is equivalent to 16.1 cubic feet of hydrogen per pound of magnesium at 25°C. When the volume of hydrogen is measured at 23.7°C, there are 3.47 calories liberated for each ml of hydrogen evolved.

Reaction of finely divided magnesium with seawater:

From Table 1, it is apparent that the speed of reaction of various forms of magnesium with seawater ranges from those that react too slowly to serve as a heat source for divers to those that react too rapidly. One can prepare a magnesium specimen that will react very slowly and require months to be consumed, or one can prepare a specimen that will react suddenly and be consumed in a few seconds.

The experiments with the various magnesium and iron powders disclosed that, with other factors being constant, the rate of evolution of hydrogen, and hence the rate of liberation of heat, is related to the surface area of the magnesium reacting with the seawater. For example, the most finely divided magnesium powders reacted the most rapidly; the coarse powders, at an intermediate rate; and the turnings, at the slowest rate. Also, hydrogen was evolved from 1 gm of coarse magnesium powder in seawater at approximately twice the rate that it was liberated from ½ gm of the same powder in seawater. The surface area of the 1-gm sample of magnesium powder would be twice that of the ½-gm sample. Both findings strengthen the conclusion that the rate of the reaction of magnesium with seawater is a function of the surface area of the magnesium.

Another important factor determining the rate of reaction of magnesium with seawater is the intimacy of contact of the magnesium with iron. When no iron was presumed to be present, magnesium turnings and powders reacted with seawater but the rate was too slow to be considered as a potential source of heat for divers. Merely mixing finely divided magnesium samples with iron powder caused them to react with seawater twice as rapidly. However, the speed of the reaction was still too slow to serve as a potential heat source for divers. Grinding mixtures of iron and magnesium turnings and powders together in a ball mill jar produced a composite material consisting of magnesium particles into which iron particles were embedded. The ironized magnesium reacted with seawater 50 times or so more rapidly than the simple mixture of iron and magnesium. The reaction rates of the ironized materials were sufficiently rapid to be considered as sources of heat for divers.

The speed of reaction of a shunted magnesium-iron seawater battery is a function of the area of the iron plate in electrical contact with magnesium. The ironized magnesium is in essence a collection of tiny shunted magnesium-iron seawater batteries. Therefore, the area of the iron particles in electrical contact with the magnesium particles also is a factor determining the reactivity of ironized magnesium and seawater.

Reaction of pelletized magnesium powder with seawater:

There was no striking difference in the reactivities of pelletized and unpelletized ironized magnesium powder. The pellets reacted at a little slower rate than the unpelletized material during the first half hour of the experiment, but they reacted more rapidly in the ensuing time intervals.

The reactivity of pellets made from simple mixtures of iron and magnesium was a function of the amount of iron they contained. Hydrogen was evolved most rapidly from the pellets to which the greatest amount of iron powder had been added, and the least rapidly by the pellets to which no iron powder had been added. Intimate galvanic contact between the iron and magnesium was apparently achieved by the compressing process. It was not necessary to first ironize the magnesium in a ball mill jar.

Pelletizing magnesium and iron powders apparently affected their reactivity with seawater in two ways. Compressing the mixture of iron and magnesium powders brought iron and magnesium particles into more intimate contact, thereby causing the product to react more readily than the initial mixture. Compressing the ironized magnesium powder did not significantly alter the proximity of the magnesium and iron particles to each other. They were already in intimate contact. The compression process did, however, at least partially fuse the magnesium and iron particles into a solid pellet. Seawater had access only to the outside of the pellet when it was immersed. After the pellet reacted a little, however, it crumbled and reacted at a slightly more rapid rate than the unpelletized material.

A material more thoroughly fused than the pellets, which were compressed at 37,500 psi, should react at a more uniform rate throughout its existence in seawater. Reaction rates thus can be controlled by the area of the surface of the pellets. The area will change slowly if the pellets do not crumble and the reaction will proceed at a nearly uniform rate. More thorough fusion can be achieved by higher pressures and temperatures than have been used. Addition of other materials that are soft, malleable, and highly conductive can also be considered as a means for achieving fusion.

Measurements of the production of heat:

The calculated heat of reaction for the complete reaction of one-half gram of magnesium with seawater is 1,735 calories at 25°C. However, as seen in Table 2, the calculated heat corresponding to the volume of hydrogen evolved up to the time that the maximum temperature was reached was in the vicinity of 1,250 calories. The measured calories approached the calculated as the volume of water was increased. This was to be expected because temperature rise and the heat loss become smaller as the volume of water is made larger.

The rises in temperature were of a range of magnitudes expected for the theoretical amount of heat liberated. The rises were in a range consistent with the classical thermodynamic statement for the reaction of magnesium and water represented by the equation:

$$Mg + 2 H_2O \rightarrow Mg(OH)_2 + H_2 + \Delta h$$

where $\Delta h$ = 3.57 calories per mg of magnesium or 1,830 watt-hours per pound of magnesium The "dry" magnesium heat cell:

A heat cell can be made with the dry ironized magnesium powder to which a limited amount of seawater is added for activation. Heat will be liberated whenever seawater is injected into the charge of ironized magnesium powder. If NaCl is mixed with the dry ironized magnesium powder, only water need be added.

In another experiment, water addition did control the rate of the reaction somewhat for the first half hour. After that, however, sufficient water was present to decompose all of the magnesium. Temperature curves indicated that less heat was produced per given weight of ironized magnesium when the seawater was admitted slowly, as in the dry heat cell, than when an abundance of seawater was added immediately.

The dry heat cell has numerous desirable features. It is simple to operate and regulate. The diver can admit water to the cell whenever he feels cold and the response will be quite rapid. It is not necessary to use up all of the ironized magnesium in a single dive. The cell will soon cease to react if water is cut off. The size of the cell can easily be scaled up or down. Tiny cylinders can be made to fit into the finger holes of gloves; medium sized cylinders would be made for short dives; or large cylinders could be made for extended dives. Interchangeable cylinders charged with ironized magnesium could be made to fit into a water jacket which surrounds the cylinders. Only one pump is required to conduct the heat exchanger fluid to the diver.

In the "dry cell" experiment, approximately 350 ml of hydrogen were evolved from 500 mg of ironized magnesium. Calculations based on 350 ml of hydrogen indicate that approximately 2,500 calories will be liberated per gram of ironized magnesium. A charge of 344 grams of ironized magnesium are required for a one-kilowatt-hour (kwh) cell. Initially this would occupy about one-third of a liter of space. After reacting with approximately 500 ml of seawater, the magnesium would swell to completely occupy a one-liter container. A cylinder the size of a standard scuba tank will hold a 14-kwh cell, and can be initially charged with nearly 5 kilograms of ironized magnesium powder. It requires a minimum of 7 liters of seawater for complete reaction. During the reaction, 3,700 liters of hydrogen will be evolved.

From the above experimental investigation, it has been determined that:

Magnesium alone reacts spontaneously with seawater but the rate is far too slow to use as a heat source for divers.

Hydrogen is evolved and heat is produced at a rate which is approximately proportional to the surface area of magnesium reacting with seawater. The surface area depends upon the weight of magnesium and the particle size.

Merely mixing iron powder with finely divided magnesium causes magnesium to react with seawater twice as rapidly as before mixing.

Grinding iron and magnesium powders or turnings together in a ball mill jar produces a material which reacts with seawater nearly 100 times more rapidly than pure magnesium powders.

Compressing iron and magnesium powders together under a pressure of 37,500 psi produces pellets which react with seawater many times more rapidly than pure magnesium powder. The reaction rates are a function of the amount of iron powder the pellets contain.

Ironized magnesium powder initially reacts very rapidly with seawater and slows down rather abruptly as the reaction proceeds. Pelletized ironized magnesium reacts with a somewhat more uniform rate and does not undergo an initial spurt in activity.

The initial rate of reaction of magnesium and seawater is a function of temperature. The higher the temperature is, the more rapid the initial reaction.

Once the initial high velocity reactions have subsided, less hydrogen and presumably less heat is evolved by the reaction of magnesium and seawater at 68°C than at 0°C or at 24°C.

The experimental measurements of the liberation of heat by the reaction of magnesium and seawater are in a range to be consistent with a theoretical heat of reaction of 84.36 kilogram calories per mole of magnesium.

The reaction of ironized magnesium and seawater can be regulated by the controlled addition of seawater.

The space required for a 1-kwh heat cell charged with dry ironized magnesium is 1 liter.

Finely divided iron and magnesium can be made into a composite material sufficiently reactive with seawater to serve as a heat source. One manner in which the reaction can be controlled is to control the addition of seawater, adding water only when more heat is desired.

Figure 4:
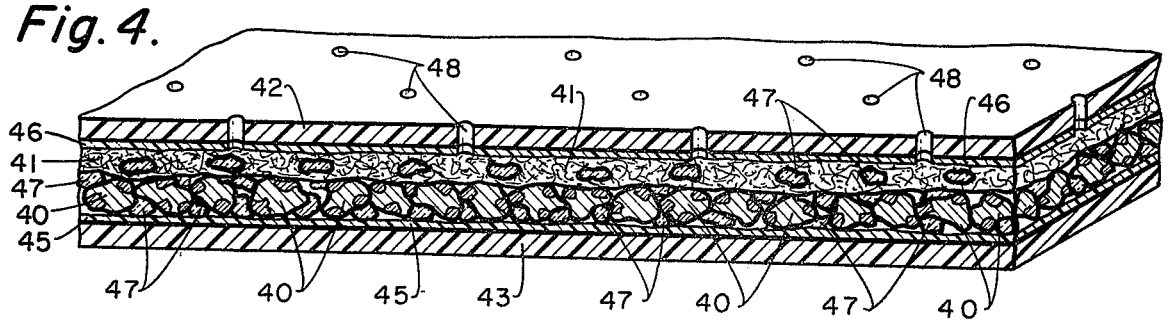
FIG. 4 is an embodiment of the invention illustrating in cross-section the structure of an exothermic material or blanket using micro electrochemical cells.
Figure 5:
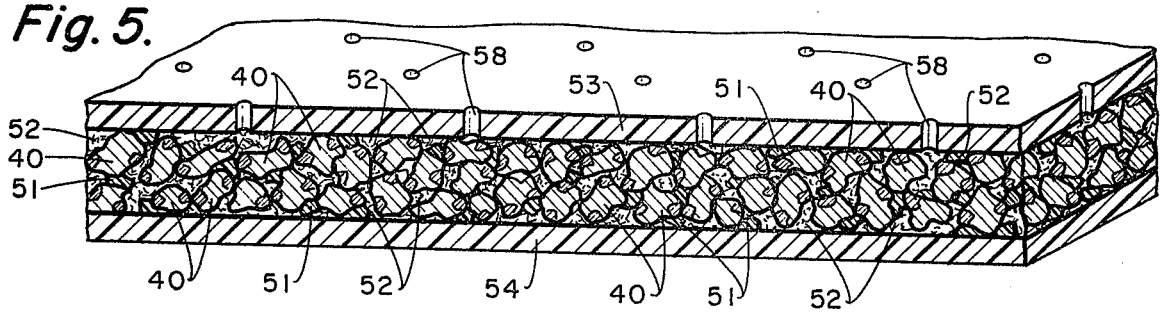
FIG. 5 shows in cross-section another embodiment of a flexible heating material using micro electrochemical cells.

Another use for the powdered metal heat source of this invention is in the making of a material, such as shown in FIGS. 4 and 5, which have a large variety of applications. For example, such heating materials can be used for gloves, socks, boot liners, foot pads and other garments for warming various parts of the body, as well as for medical heat pads, warmers for food cans, and sleeping bag heaters to provide a thermal barrier between the sleeping bag and cold ground, and the like.

As shown in the embodiment of FIG. 4, by way of example, ironized magnesium particles 40 are sandwiched together with an absorbent material 41 which retains moisture, between two flexible sheets of thin plastic material 42 and 43, such as mylar or polysulfonates, for example. Plastic sheet 43 is provided with an adhesive layer 45 which holds the ironized magnesium particles 40 in place. Plastic sheet 42 can also be provided with an adhesive layer 46 for adhering to the absorbent material 41. Sodium chloride particles 47 can be mixed with either the absorbent material 41 or the ironized magnesium particles 40, or both, as desired. Holes 48 are provided in plastic sheet 42 to admit water which dissolves the sodium chloride and activates the micro electrochemical cells 40. Holes may be provided in both sheets of plastic material 42 and 43, if desired, for faster introduction of water. Where seawater is introduced via holes 48, the sodium chloride particles 47 would not need to be provided in the absorbent material 41 or mixed with the magnesium and iron particles.

The embodiment illustrated in FIG. 5 shows a mixture of ironized magnesium particles 40, adhesive 51 and absorbent material 52 all sandwiched between plastic sheets 53 and 54. The adhesive particles 51 bond the ironized magnesium particles and absorbent material together and to plastic sheets 53 and 54. Holes 58 are provided for admitting seawater to start the exothermic reaction. If desired, sodium chloride particles can be mixed with the ironized magnesium particles 40, adhesive 51 and absorbent material 52, thus only requiring plain water to be introduced for starting the reaction. Powdered iron and powdered magnesium can be used instead of ironized magnesium particles in either of the embodiments shown in FIGS. 4 and 5 where a slower reaction is desired.

Obviously many modifications and variations of the present invention are possible in light of the above teachings. It is therefore to be understood that within the scope of the appended claims the invention may be practiced otherwise than as specifically described.

We claim:

1. An electrochemical source for the rapid generation of heat and hydrogen gas upon activation by electrolyte, comprising:
   a. an intimate mixture of powdered magnesium and iron metal particles in contact with each other such that the normal electrical contact resistance between said magnesium and iron powdered metal particles is substantially reduced;
   b. said iron metal particles being embedded in the surface of at least a substantial portion of said magnesium metal particles to form ironized magnesium particles;
   c. each ironized magnesium metal particle forming a shorted micro electrochemical cell;
   d. said intimate powdered metal mixture which includes micro electrochemical cells being sandwiched between sheets of plastic material;
   e. moisture retaining absorbent means being included with said intimate powdered metal mixture between said sheets of plastic;
   f. said intimate mixture of powdered metal particles operable to produce heat and hydrogen by exothermic reaction upon addition of suitable electrolyte;
   g. the variation of powder sizes and of the ratio of magnesium to iron metal surface area exposed, operating to control the amount of heat and hydrogen produced and the operational life of said source in the electrolyte.

2. An electrochemical source as in claim 1 wherein said moisture retaining absorbent means is mixed with said intimate mixture of ironized magnesium particles and an adhesive and is sandwiched between said sheets of plastic material to form a flexible exothermic fabric, said sandwiched structure having means for introducing electrolyte to said micro electrochemical cells.

3. A structure as in claim 1 wherein NaCl particles are mixed with said metal particles such that addition of water will provide electrolyte.

4. An electrochemical source as in claim 1 wherein each of said sheets of plastic have an adhesive coating on at least one side thereof and said moisture retaining absorbent means is an absorbent material layer; said intimate mixture of magnesium and iron metal particles being sandwiched between one said adhesive-coated sheet of plastic and said layer of moisture retaining absorbent material which in turn is attached to an adhesive coating on the second sheet of plastic to form a flexible sandwiched heating structure, said plastic sheets forming the outside of said sandwiched structure, means provided in at least one of said plastic sheets for introducing electrolyte to said mixture when desired.

5. An electrochemical structure as in claim 4 wherein NaCl particles are interdispersed throughout said layer of moisture retaining absorbent material such that addition of water thereto will provide electrolyte for the exothermic reaction involving said shorted micro electrochemical cells.

6. An electrochemical source as in claim 5 wherein the ratio of magnesium to iron metal particles by weight is 1 to 1.

7. An electrochemical source as in claim 4 wherein NaCl particles are interdispersed throughout said intimate mixture of magnesium and iron metal particles.

8. An electrochemical source as in claim 1 wherein said metal particles range in size up to 590 microns in diameter.

9. An electrochemical source as in claim 1 wherein said intimate mixture of ironized magnesium metal particles are compressed and formed into a rigid composite material.

10. An electrochemical source as in claim 9 wherein dry electrolyte salt particles are interdispersed throughout said powdered metal particle mixture such that addition of water will dissolve said salt to start electrochemical reaction.

11. An electrochemical source as in claim 1 wherein said intimate mixture of iron and magnesium powdered metal particles are pressed and sintered together into a rigid form.

12. An electrochemical source as in claim 1 wherein the ratio of magnesium to iron metal particles by weight is 1 to 1.

* * * * *